LEONHARD RODENHAUSEN. 2 Sheets--Sheet 1.

Improvement in Street Sprinkling Carts.

No. 4,590. Reissued Oct. 10, 1871.

Witnesses:
J. E. Schmitz
Geo. T. Kneas.

Inventor:
Leonhard Rodenhausen
by Wm. A. Rodenhausen
Atty

AM PHOTO-LITHOGRAPHIC CO. N.Y. (OSBORNE'S PROCESS.)

LEONHARD RODENHAUSEN. 2 Sheets--Sheet 2.
Improvement in Street Sprinkling Carts.
No. 4,590. Reissued Oct. 10, 1871.
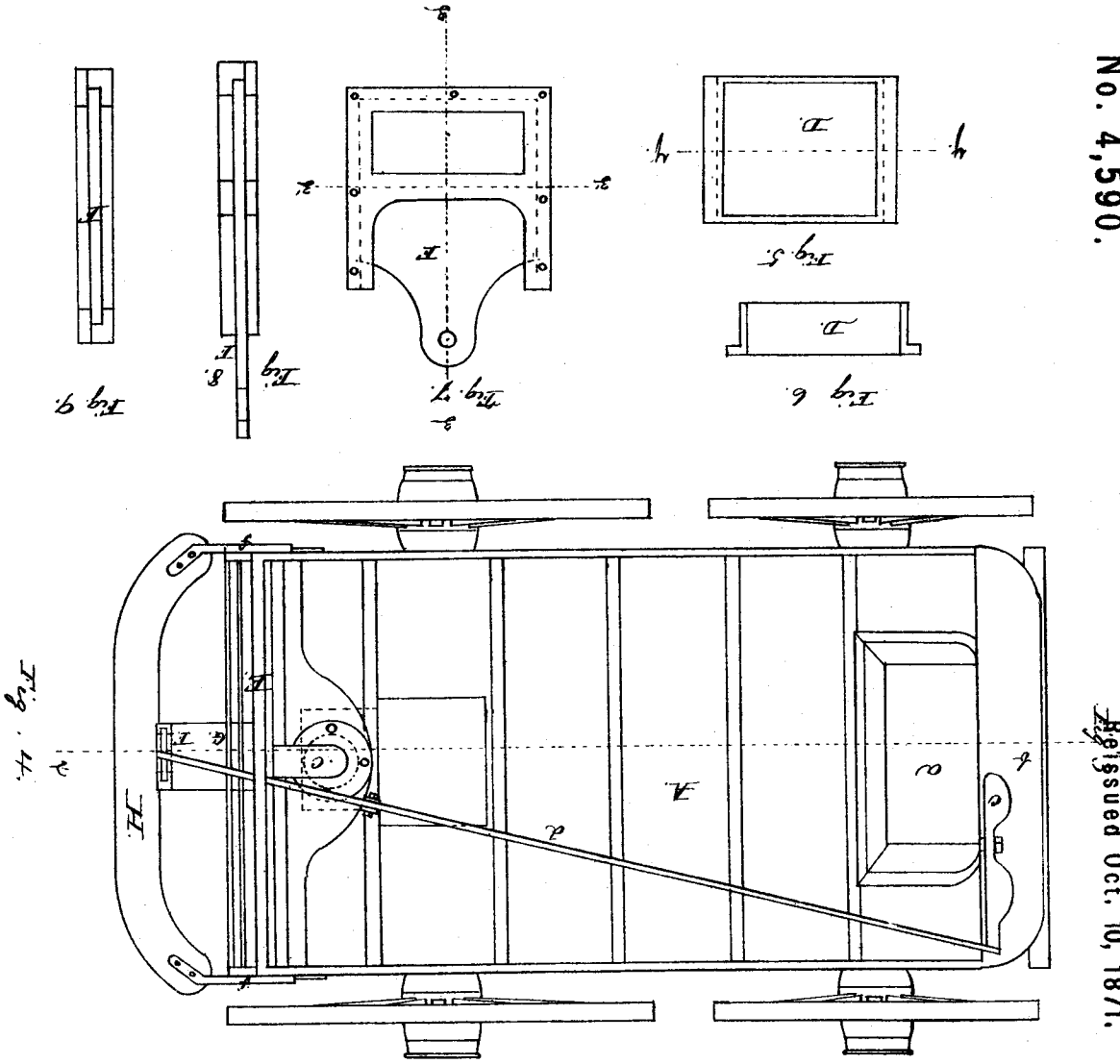
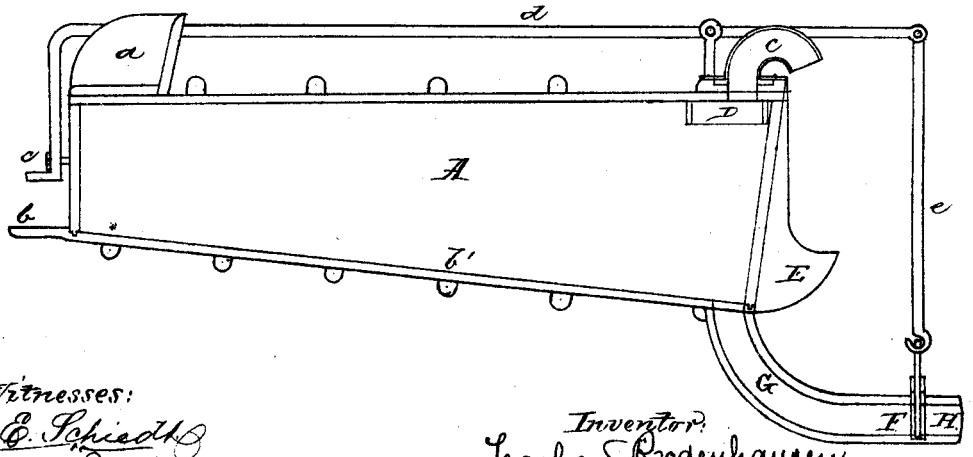
Witnesses:
J. E. Schiedt
Percy V. Kneass.
Inventor:
Leonhard Rodenhausen.
by John A. Wiedersheim.
Atty.
A.M. PHOTO-LITHOGRAPHIC CO. N.Y. (OSBORNE'S PROCESS.)

UNITED STATES PATENT OFFICE.

LEONHARD RODENHAUSEN, OF PHILADELPHIA, PENNSYLVANIA.

IMPROVEMENT IN STREET-SPRINKLING CARTS.

Specification forming part of Letters Patent No. 67,805, dated August 13, 1867; reissue No. 4,590, dated October 10, 1871.

*To all whom it may concern:*

Be it known that I, LEONHARD RODENHAUSEN, of the city and county of Philadelphia and State of Pennsylvania, have invented new and useful Improvements in Sprinkling-Carts; and I do hereby declare the following to be a clear and exact description of the nature thereof, sufficient to enable others skilled in the art to which my invention appertains to fully understand and use the same, reference being had to the accompanying drawing making part of this specification, in which—

Figure 2:
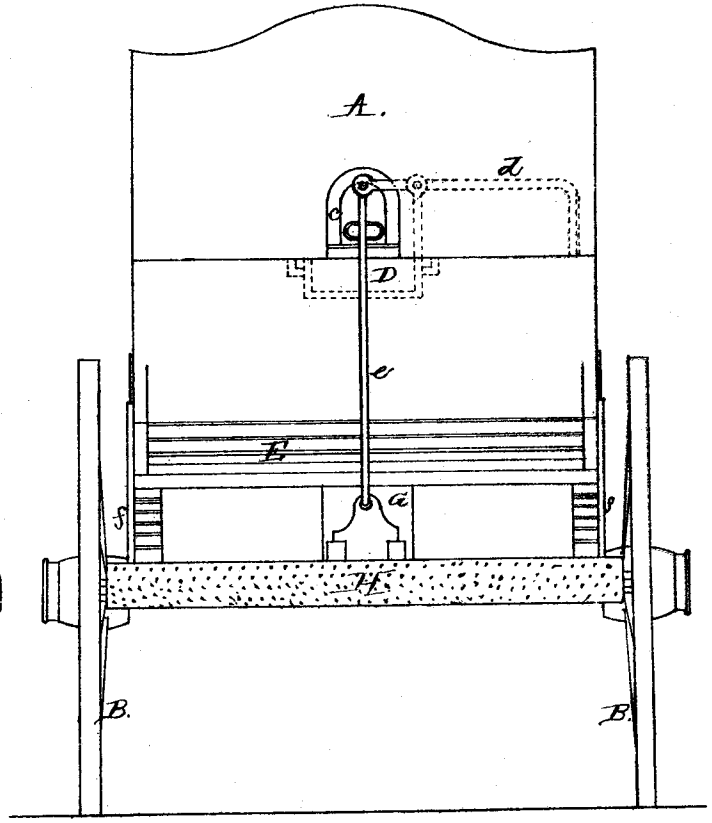
Figure 1:
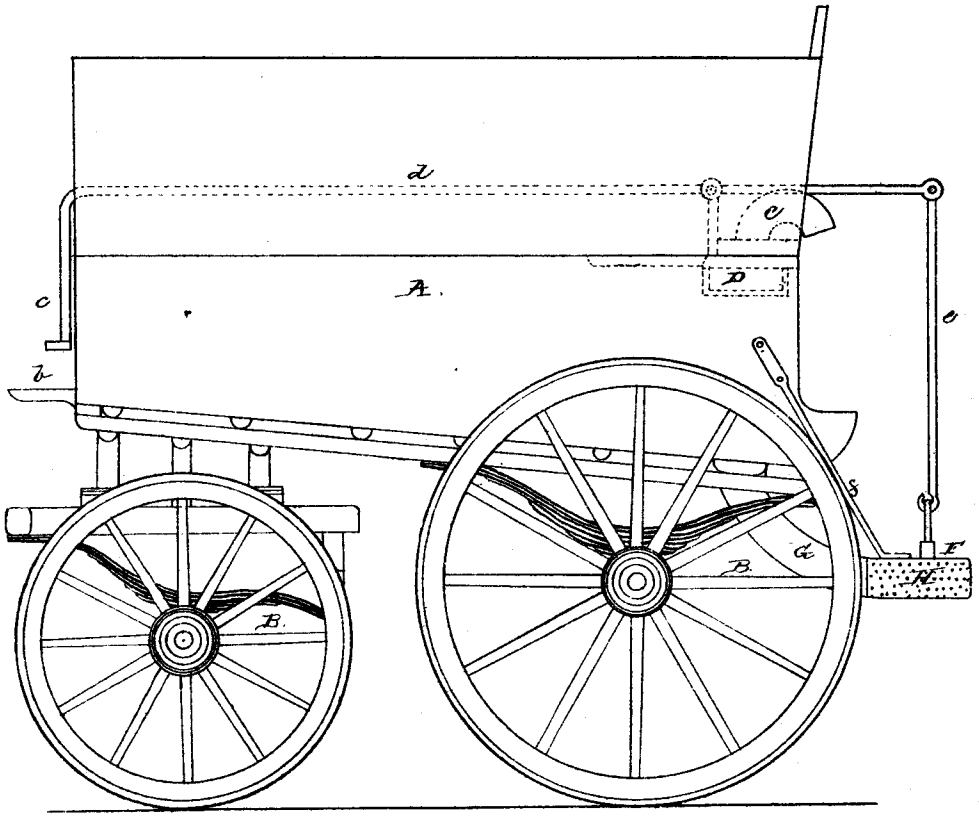

Figure 1 is a side view of the device illustrating my invention. Fig. 2 is a rear-end view of the same. Fig. 3 is a plan or top view thereof. Fig. 4 is a longitudinal section in line *x x*, Fig. 3. Fig. 5 is a top view of the strainer. Fig. 6 is a longitudinal vertical section in line *y y*, Fig. 5. Fig. 7 is a front view of the valve. Fig. 8 is a transverse vertical section in line *z z*, Fig. 7. Fig. 9 is a longitudinal vertical section in line *z′ z′*, Fig. 7.

Similar letters of reference indicate corresponding parts in the several figures.

My invention relates to sprinkling-carts; and consists in the arrangement of a valve at the junction of the eduction-pipe and sprinkler, so that water may be instantly cut off from the sprinkler. It also consists in the construction of the body of a sprinkling-cart with a closed body, having an inclined bottom, an induction-pipe, an eduction-pipe, a sprinkler, and a suitable valve.

Referring to the drawing, A represents the body of the sprinkling-cart, which is mounted on suitable running-gear, B, and provided with a seat, *a*, and step, *b*. The body of the cart—or reservoir for the water—is closed on all sides, except at points about which are secured the induction-pipe C and the eduction-pipe G. In the present case the induction-pipe is arranged on the upper side of the body, and is designed to have a hose attached thereto whereby the reservoir may be filled. The eduction-pipe or tube G projects from the lower side of the body A downwardly and outwardly, and is connected at right angles to the spreader or sprinkler H, which is retained in place and supported by suitable brace-rods *f* on the body A. The body of the cart or reservoir is closed, as will be seen, and prevents the splashing of the water outside of the body. The ordinary sprinkling-carts are constructed of barrels or bodies which have openings in their tops for the reception of the hose, which hangs into the barrel or body, the openings being covered by hinged doors or flaps. When the barrel or body is full the doors or flaps are closed, and the great body of water, while the cart is in motion, naturally causes great agitation and splashing against the doors or flaps, which, though secured, are soon loosened or broken, and water is permitted to escape, thus wetting the driver and passers-by. My invention will remedy these objections, as has been previously stated. D represents a strainer, which consists of a box having a sieve or netting suitably applied thereto, and is arranged or suspended below the induction-pipe C. Any dirt or sticks, and the like, that may flow with the water into the cart will be intercepted by the strainer and be prevented from entering the reservoir, thereby avoiding clogging of the sprinkler and permitting the water to pass out freely therefrom. The bottom or lower side *b′* of the reservoir A is inclined toward the rear, whereby the cart, when not in use, can be properly drained of any water that might otherwise remain in it, and premature rotting of the wood is prevented. This inclined bottom also increases the force of the water as it escapes, and causes the same to sprinkle thoroughly in the form of spray, which is accomplished when the water is forcibly ejected from the spreader or sprinkler. If the hose is carried with the cart, it may be placed in a grating or receptacle, E, located at the rear of the cart, and where said hose has facilities for draining and drying. On the forward end of the body, above the step *b*, there is pivoted a foot-lever, *c*, to which is pivoted a lever, *d*, whose bearing is on the upper side of the body A. A lever, *e*, is pivoted at the rear end of lever *d*, and is secured to a valve, F, which is located at the point where the eduction-tube G joins the spreader H, said point being where the water enters the sprinkler. Pedestrians have made serious complaint of the sloppy and wet crossings caused by the inability of the driver of the old style of cart to prevent it. The valves in such carts are located in the barrel or body, and, when closed, do not instantly shut off the water at the spreader, owing to the quantity in the induction-tube. By my arrangement the flow of water can be immediately checked at any time, and only the little that remains in the sprinkler can escape. The eduction-pipe may be curved or perfectly cylindrical and the construction of the sprinkler varied. A portion or all of the eduction-pipe may be made of flexible material; but if of metal or other strong substance, will assist in supporting the sprinkler.

The valve F is to be closed and a hose attached to the induction-pipe C and connected to the plug or other place of supply. When the water is turned on the body A will fill. When said body is full the water will overflow at a small orifice or opening in the body, and the water must then be turned off. When the streets or roads are to be sprinkled the driver opens the valve by means of the levers *c d e*, which permits the water to fill the spreader and escape through the perforations thereof. Should it be desired or necessary to shut off the water in passing a crossing, or the second time over the same road or street, or for any other reason, the driver closes the valve, and the supply of water to the spreader immediately ceases.

All dirt, or matters that would clog the spreader, is collected in the strainer D before the water enters the body of the cart, and can be removed at suitable times.

When the cart is no longer in use the valve is opened, and all water in the body will pass out, the inclined bottom causing it to drain and preventing the lodgement or collection of the water. Air will readily circulate in the body of the cart through the induction and eduction-pipes.

The means for operating the valves can be varied. Side and back pieces extend upward from the body A, and the space inclosed thereby forms a receptacle for the feed of the animals, the driver's clothes, whip, &c.

The improvements are simple in construction, but exceedingly practical and useful.

Having thus described my invention, what I claim as new, and desire to secure by Letters Patent, is—

1. In a sprinkling-cart, the valve F, located at the junction of the eduction-pipe and sprinkler, substantially as and for the purpose described.

2. A sprinkling-cart having the following characteristics: a closed body, A, having an inclined bottom, *b'*, induction-pipe C, eduction-pipe G, sprinkler H, and a suitable valve, substantially as and for the purpose described.

The above signed by me this 24th day of June, 1871.

LEONHARD RODENHAUSEN.

Witnesses:

JOHN A. WIEDERSHEIM,
PERCY V. KNEASS.

(167)